(12) United States Patent
Hayton

(10) Patent No.: US 7,966,524 B2
(45) Date of Patent: Jun. 21, 2011

(54) SYSTEMS AND METHODS FOR GATHERING AND SELECTIVELY SYNCHRONIZING STATE INFORMATION OF AT LEAST ONE MACHINE

(75) Inventor: Richard Hayton, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 301 days.

(21) Appl. No.: 12/253,550

(22) Filed: Oct. 17, 2008

(65) Prior Publication Data

US 2009/0106220 A1 Apr. 23, 2009

Related U.S. Application Data

(60) Provisional application No. 60/981,212, filed on Oct. 19, 2007.

(51) Int. Cl.
*G06F 11/00* (2006.01)
(52) U.S. Cl. ........................................................ 714/38
(58) Field of Classification Search .............. 714/15–18, 714/20, 21, 25, 37–39, 43, 47, 49, 50
See application file for complete search history.

(56) References Cited

U.S. PATENT DOCUMENTS

| | | | |
|---|---|---|---|
| 5,754,119 A * | 5/1998 | Deluca et al. ................. | 340/7.21 |
| 6,859,829 B1 | 2/2005 | Parupudi et al. | |
| 7,111,059 B1 * | 9/2006 | Garcea et al. .................. | 709/224 |
| 7,546,369 B2 * | 6/2009 | Berg ............................... | 709/227 |
| 7,568,025 B2 * | 7/2009 | Vasudeva ....................... | 709/224 |
| 7,640,258 B2 * | 12/2009 | Garcea et al. .......................... | 1/1 |
| 7,664,788 B2 * | 2/2010 | Aust ............................... | 707/620 |
| 2002/0116475 A1 * | 8/2002 | Berg ............................... | 709/219 |
| 2006/0155776 A1 * | 7/2006 | Aust ............................... | 707/201 |

FOREIGN PATENT DOCUMENTS

| | | |
|---|---|---|
| GB | 2353664 | 2/2001 |
| WO | WO-96/24899 | 8/1996 |
| WO | WO-99/59326 | 11/1999 |

OTHER PUBLICATIONS

Written Opinion for PCT/2008/080308 mailed Mar. 12, 2009.
ISR for PCT/2008/080308 mailed Mar. 12, 2009.

\* cited by examiner

*Primary Examiner* — Nadeem Iqbal
(74) *Attorney, Agent, or Firm* — Foley & Lardner LLP; John D. Lanza

(57) ABSTRACT

A method for gathering and selectively synchronizing state information of at least one machine includes generating, by a first machine, a query identifying a plurality of metrics characterizing a state of a second machine and at least one criterion identifying a circumstance in which to respond to the query. The method includes determining, by the second machine, whether to respond to the query, responsive to the criterion in the query. The method includes transmitting, by the second machine, to the first machine, a response including a subset of the plurality of metrics, responsive to the determination. A system for gathering and selectively synchronizing state information of at least one machine, includes a first machine generating a query. The system includes an agent, on the second machine, determining whether to respond to the query, and transmitting a response including a subset of the plurality of metrics, responsive to the determination.

23 Claims, 6 Drawing Sheets

SYSTEMS AND METHODS FOR GATHERING AND SELECTIVELY SYNCHRONIZING STATE INFORMATION OF AT LEAST ONE MACHINE

RELATED APPLICATIONS

The present application claims priority to U.S. Provisional Patent Application Ser. No. 60/981,212, entitled "Systems and Methods for Maintaining and Communicating Server State," filed Oct. 19, 2007, which is incorporated herein by reference.

FIELD OF THE DISCLOSURE

This disclosure generally relates to systems and methods for communicating state information of a machine. In particular, this disclosure relates to systems and methods for gathering and selectively synchronizing state information of at least one machine.

BACKGROUND OF THE DISCLOSURE

Typical systems for monitoring load on networked machines may include a first machine (which may be referred to as a collator) monitoring the status of a second machine (which may be referred to as a worker). In some conventional systems, a worker machine transmits the worker machine's status or status history to a collator machine, either in response to a request for status or at certain preset times. In some of these systems, a worker machine transmits a metric to a collator machine whether or not there is a substantial change in the metric (i.e., "blind" reporting). In another of these embodiments, a worker machine responds even if the network traffic is high or if there is a network disruption, and this may result in unnecessary, excessive network load. In still another of these embodiments, the collator machine processes incoming responses from worker machines regardless of whether the associated metrics have changed, which may result in processing inefficiency.

Typically, the number of metrics associated with the worker machine's status or status history is pre-configured and remains static. In some embodiments, when transmitting a response, the worker machine may either transmit all metrics associated with a worker machine's status or not transmit any metrics at all. Typically, conventional monitoring systems do not include intelligent processes for a collator machine to dynamically alter the granularity of a collator machine's request for status. Moreover, conventional systems generally do not include intelligent processes for a worker machine to dynamically determine the granularity of information to include in a response. In some embodiments, the metrics for monitoring are built into the systems and may not be adjusted easily. In other embodiments, the monitoring systems may require worker machines to communicate with either a central collator machine or with other worker machines, and the metrics monitored for each worker machine may not be updated easily or independently of the central collator machine or other worker machines.

BRIEF SUMMARY OF THE DISCLOSURE

In one aspect, a method for gathering and selectively synchronizing state information of at least one machine includes generating, by a first machine, a query identifying a plurality of metrics characterizing a state of a second machine and at least one criterion identifying a circumstance in which to respond to the query. The method includes determining, by an agent on the second machine, whether to respond to the query, responsive to the at least one criterion in the query. The method includes transmitting, by the second machine, to the first machine, a response including a subset of the plurality of metrics, responsive to the determination. In one embodiment, the method includes generating, by the first machine, a query including at least one filter identifying the subset of the plurality of metrics. In another embodiment, the method includes generating, by the first machine, a query including at least one criterion specifying a time at which to transmit the response to the first machine. In still another embodiment, the method includes determining not to transmit a response to the first machine, responsive to the determination. In yet another embodiment, the method includes transmitting, by the second machine, a response including at least one metric not included in the plurality of metrics, responsive to the determination.

In one embodiment, the method includes transmitting, by the second machine, a response including at least one additional metric not included in the plurality of metrics, responsive to the determination. In another embodiment, the method includes transmitting, by the second machine to the first machine, the response to the query including a plurality of metrics identified in a second query. In still another embodiment, the method includes maintaining, by the second machine, a record of the subset of the plurality of metrics included in the response transmitted to the first machine. In yet another embodiment, the method includes identifying a second subset of the plurality of metrics to include in a second response to the first machine, the identification based in part on the maintained record.

In one embodiment, the method includes generating, by a third machine, a query transmitted to a first machine, identifying a second plurality of metrics characterizing a state of a second machine and at least one criterion identifying a circumstance in which to respond to the query. In another embodiment, the method includes receiving, by a third machine, a response from the first machine, the response from the first machine including a subset of the second plurality of metrics describing the state of the second machine.

In another aspect, a system for gathering and selectively synchronizing state information of at least one machine includes a first machine generating a query identifying a plurality of metrics characterizing a state of a second machine and at least one criterion identifying a circumstance in which to respond to the query. The system includes an agent, on the second machine, determining whether to respond to the query, responsive to the identified at least one criterion in the query, and transmitting a response including a subset of the plurality of metrics, responsive to the determination.

In one embodiment, the first machine generates a query including at least one filter identifying the subset of the plurality of metrics. In another embodiment, the first machine generates a query including at least one criterion specifying a time period within which to respond to the query. In still another embodiment, the at least one criterion of the query further comprises an identification of a time period relative to an event within which to respond to the query. In yet another embodiment, the event is the receipt of the query. In yet another embodiment, the event is a change in one of the plurality of metrics.

In one embodiment, the second machine further comprises a transmitter, transmitting the response including the subset of the plurality of metrics to the first machine. In another embodiment, the second machine further comprises a transmitter, transmitting the response including a plurality of metrics identified in a second query.

In one embodiment, an agent on the second machine maintains a record of metrics included in at least one response transmitted to the first machine. In another embodiment, the agent identifies a second subset of the plurality of metrics to include in a second response, the identification based in part on the maintained record. In still another embodiment, the system includes a third machine generating a second query and transmitting the second query to the first machine, the second query identifying a second plurality of metrics describing a state of the second machine and at least one criterion for the first machine identifying a circumstance in which to respond to the query. In yet another embodiment, the third machine further comprises a receiver, receiving a response from the first machine, the response including a subset of the second plurality of metrics describing the state of the second machine.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
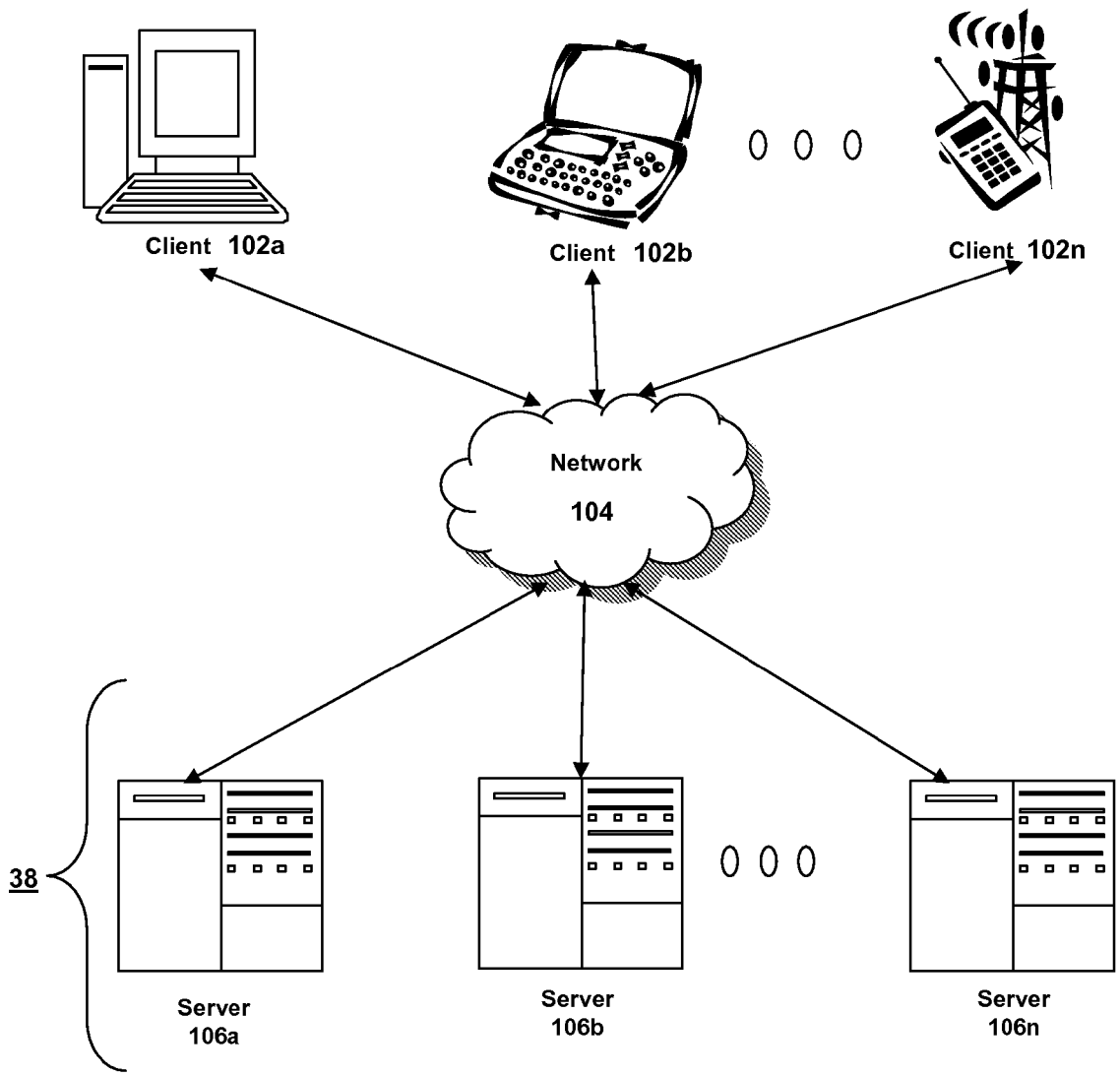
FIG. 1A is a block diagram depicting an embodiment of a network environment comprising client machines in communication with remote machines.

Referring now to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the VirtualServer or virtual PC hypervisors provided by Microsoft or others.

In order to manage a machine farm 38, at least one aspect of the performance of servers 106 in the machine farm 38 should be monitored. Typically, the load placed on each server 106 or the status of sessions running on each server 106 is monitored. In some embodiments, a centralized service may provide management for machine farm 38. The centralized service may gather and store information about a plurality of servers 106, respond to requests for access to resources hosted by servers 106, and enable the establishment of connections between client machines 102 and servers 106.

Alternatively, management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

In some embodiments, a server 106 provides a remote authentication dial-in user service, and is referred to as a RADIUS server. In other embodiments, a server 106 may have the capacity to function as either an application server or as a master application server. In still other embodiments, a server 106 is a blade server. In yet other embodiments, a server 106 executes a virtual machine providing, to a user or client computer 102, access to a computing environment.

In some embodiments, a hypervisor executes on a server 106 executing an operating system. In one of these embodiments, a server 106 executing an operating system and a hypervisor may be said to have a host operating system (the operating system executing on the machine), and a guest operating system (an operating system executing within a computing resource partition provided by the hypervisor). In other embodiments, a hypervisor interacts directly with hardware on a server 106, instead of executing on a host operating system. In one of these embodiments, the hypervisor may be said to be executing on "bare metal," referring to the hardware comprising the server 106.

In one embodiment, a server 106 may include an Active Directory. The server 106 may be an application acceleration appliance. For embodiments in which the server 106 is an application acceleration appliance, the server 106 may provide functionality including firewall functionality, application firewall functionality, or load balancing functionality. In some embodiments, the server 106 includes an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a server 106 executes an application on behalf of a user of a client 102. In other embodiments, a server 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In one embodiment, the server 106 provides the functionality of a web server. In another embodiment, the server 106a receives requests from the client 102, forwards the requests to a second server 206b and responds to the request by the client 102 with a response to the request from the server 106b. In still another embodiment, the server 106 acquires an enumeration of applications available to the client 102 and address information associated with a server 106' hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives output data, such as display data, generated by an execution of the identified application on the server 106.

In some embodiments, the server 106 or a machine farm 38 may be running one or more applications, such as an application providing a thin-client computing or remote display presentation application. In one embodiment, the server 106 or machine farm 38 executes as an application any portion of the CITRIX ACCESS SUITE by Citrix Systems, Inc., such as the METAFRAME, CITRIX PRESENTATION SERVER, CITRIX XENAPP, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the server 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A client 102 may execute, operate or otherwise provide an application, which can be any type or form of software, program, or executable instructions such as any type and/or form of web browser, web-based client, client-server application, a thin-client computing client, an ActiveX control, or a JAVA applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application includes any type of software related to voice over internet protocol (VoIP) communications, such as a soft IP telephone. In further embodiments, the application includes any application related to real-time data communications, such as applications for streaming video and/or audio.

Figure 1B:
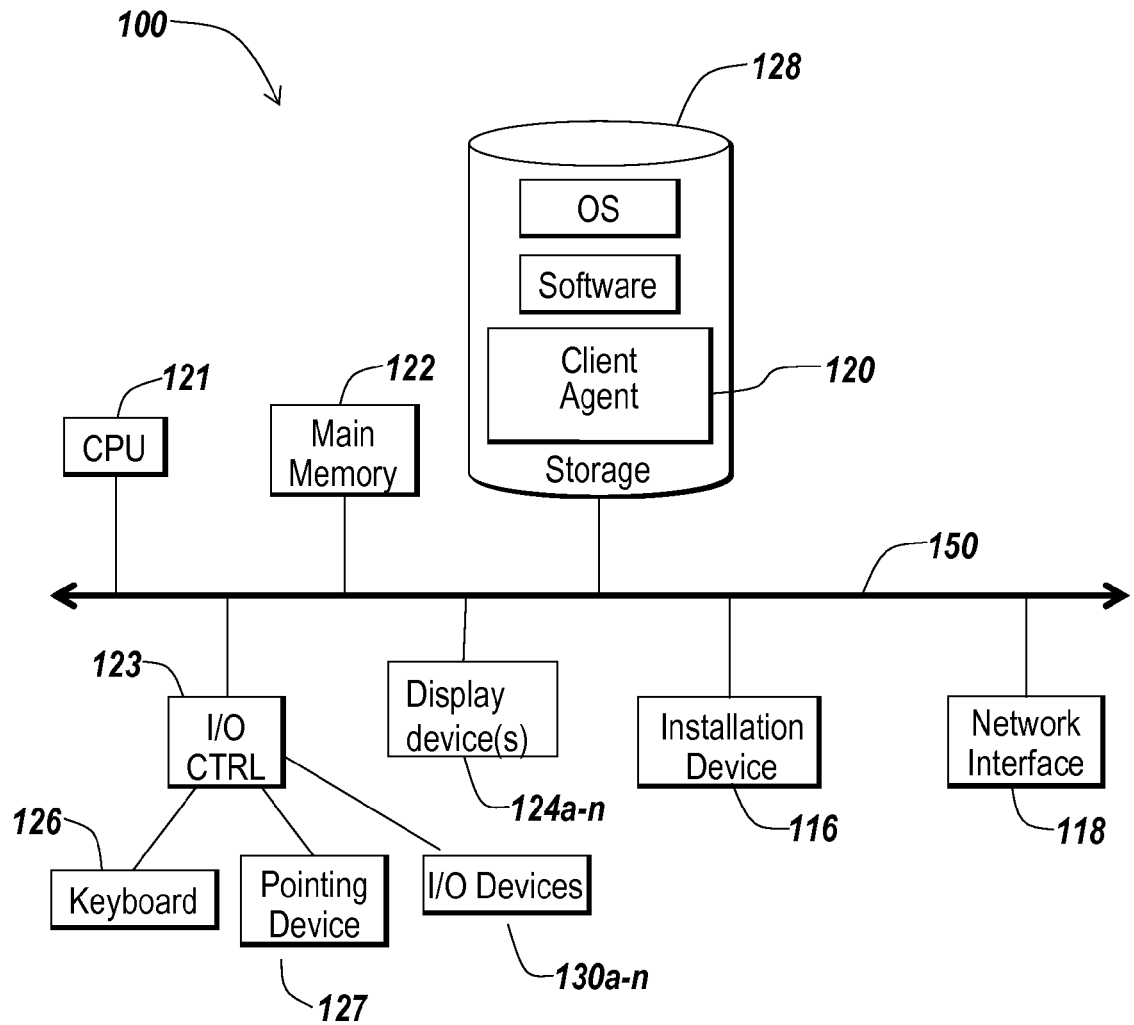
FIGS. 1B and 1C are block diagrams depicting embodiments of computing devices useful in connection with the methods and systems described herein.
Figure 1C:
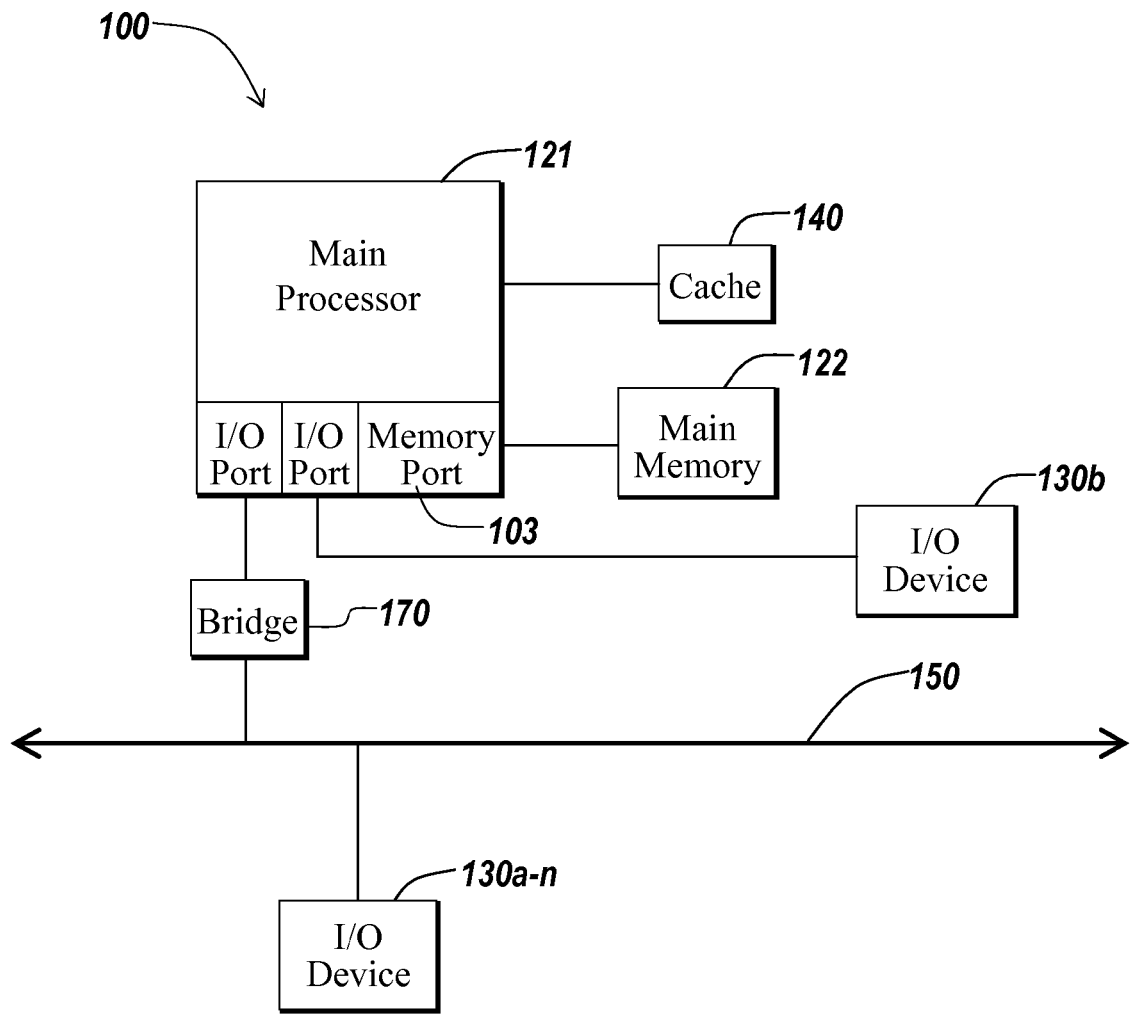

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-102n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS MOBILE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the communications device 102 includes a combination of devices, such as a mobile phone combined with a digital audio player or portable media player. In one of these embodiments, the communications device 102 is a smartphone, for example, an iPhone manufactured by Apple Computer, or a Blackberry device, manufactured by Research In Motion Limited. In yet another embodiment, the communications device 102 is a laptop or desktop computer equipped with a web browser and a microphone and speaker system, such as a telephony headset. In these embodiments, the communications devices 102 are web-enabled and can receive and initiate phone calls. In other embodiments, the communications device 102 is a Motorola RAZR or Motorola ROKR line of combination digital audio players and mobile phones.

In some embodiments, the status of one or more machines in the network is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery.

Figure 2A:
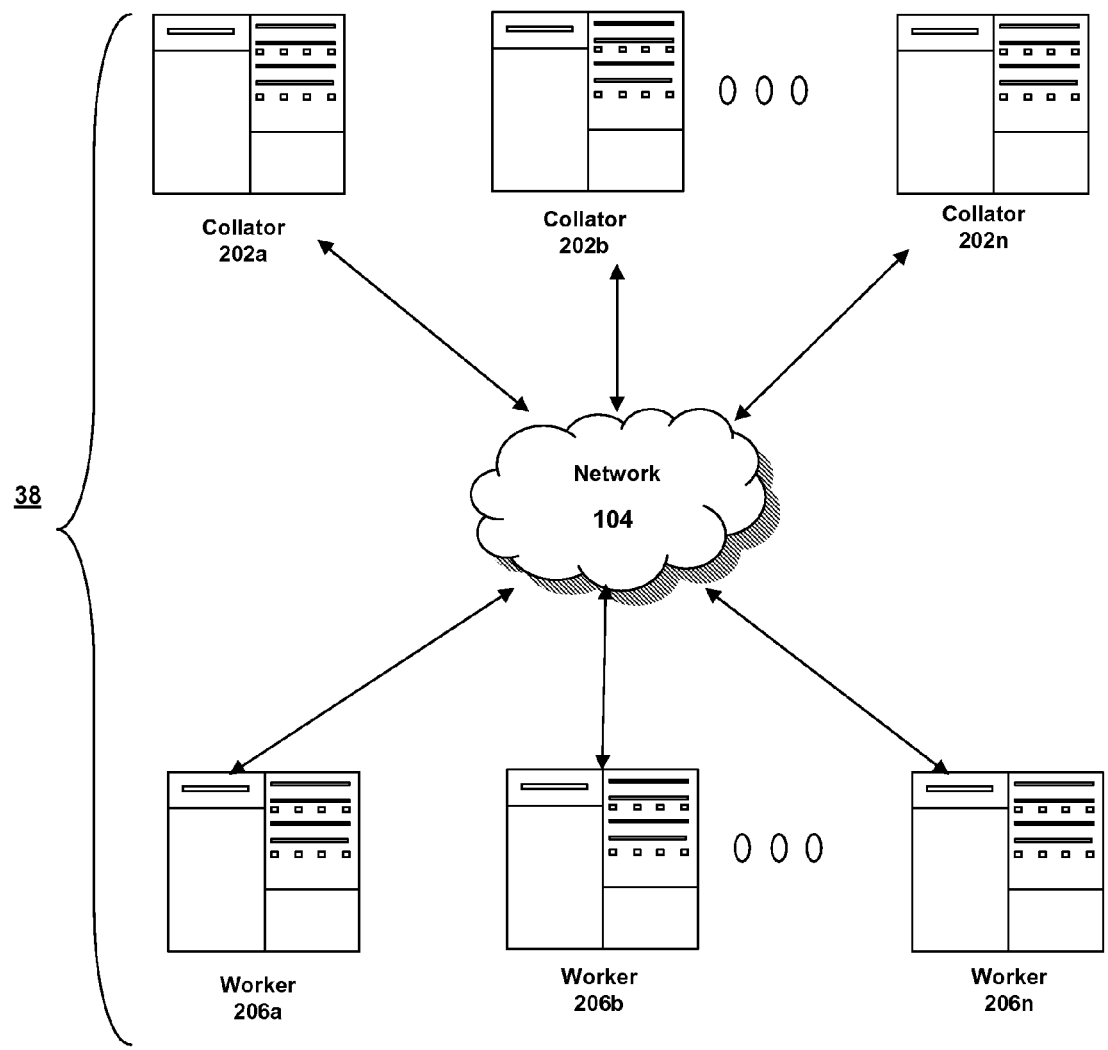
FIG. 2A is a block diagram depicting an embodiment of a system for gathering and selectively synchronizing state information of at least one machine.

Referring now to FIG. 2A, a block diagram depicts an embodiment of a system for gathering and selectively synchronizing state information of at least one machine. In brief overview, the system includes a machine farm 38, the machine farm including a plurality of machines. In one embodiment, a first subset of the plurality of machines is a plurality of collators 202a-n (hereafter referred to generally as a plurality of collators 202). In another embodiment, the machine farm 38 may include only one collator 102, referred to as a central collator. In still another embodiment, a second subset of the plurality of machines is a plurality of workers 206a-n (hereafter referred to generally as a plurality of workers 106). In yet another embodiment, the system is included in a network 104 as described above in connection with FIG. 1A. In some embodiments, a machine 106a in the machine farm 38 can be either a collator 202 or a worker 206 with respect to another machine 106b at different points in time.

In one embodiment, a plurality of workers 206 are monitored for state information on each of the plurality of workers 206. The state information from each of the plurality of workers 206 are collated at one or more of the plurality of collators 202. In another embodiment, a collator 202 is a special purpose machine, and may be referred to as a central collator. In still another embodiment, a collator 202 may monitor a subset of the plurality of workers 206. In yet another embodiment, each of the plurality of workers 206 may be monitored by a plurality of collators 202.

In one embodiment, the plurality of collators 202 may work in concert or individually. In another embodiment, for example, each of the plurality of collators 202 monitoring a subset of the plurality of workers 206 or the machine farm 38. In still another embodiment, each of the plurality of collators can monitor different aspects of the plurality of workers 206 or the machine farm 38; for example, a first collator 202a may monitor load on the plurality of workers 206 and a second collator 202b may monitor license usage by the plurality of workers 206.

In one embodiment, a collator 202 may be part of a management or administrative tool on a machine. In another embodiment, a collator 202 is reconfigurable to monitor a different subset of the plurality of workers 202 or the entire machine farm 38. In still another embodiment, a collator 202 is reconfigurable to monitor a different aspect of the plurality of workers 206 or the machine farm 38.

In one embodiment, a first collator 202a can monitor a second collator 202b. In another embodiment, a first collator 202a is in communication with a second collator 202b to monitor a worker 206, the second collator 202b in communication with the worker 206. In still another embodiment, the second collator 202b is a proxy machine for the first collator 202a. In yet another embodiment, the first collator 202a is associated with a plurality of proxy machines in order to monitor a worker 206. For example, a first collator 202a receives one response from a first worker 206a through a first proxy machine and a second response from a second worker 206b via a second proxy and a second collator 202b.

In one embodiment, a path is selected based on a number of factors including network congestion, network disruption, and proximity between the collator 202 and the worker 206. In another embodiment, a collator 202 and a worker 206 maps a path connecting the collator 202 and the worker 206 in the network 104, the mapped path including at least one address for transmission of a query 222 or a response 212. In still another embodiment, the path may include one or more intermediate nodes. In still even another embodiment, each of the one or more intermediate nodes may be a proxy, a collator, a worker, or any machine described above in connection with FIGS. 1B-1C. In yet another embodiment, a plurality of alternative paths may be mapped.

In some embodiments, the plurality of collators 202 forms a hierarchy of collators 202. In one of these embodiments, a hierarchy of collators 202 may be more efficient to manage than ring-structured chain of collators for example. In another of these embodiments, a hierarchy of collators 202 may be easier to design than a single collator monitoring distributed sections of a large machine farm, for example. In still another of these embodiments, a hierarchy of collators 202 may be easier to re-configure. In still another of these embodiments, a hierarchy of collators 202 may provide more efficient monitoring of a plurality of workers 206 or the machine farm 38. In yet another of these embodiments, a hierarchy of collators 202 may be more resilient against network disruption. In another of these embodiments, the hierarchy of collators 202 includes a plurality of levels of collators. In still another of these embodiments, each of the plurality of levels of collators communicates to the adjacent levels of collators. In still another of these embodiments, one or more central collators 202 reside at the top of the hierarchy of collators 202.

Figure 2B:
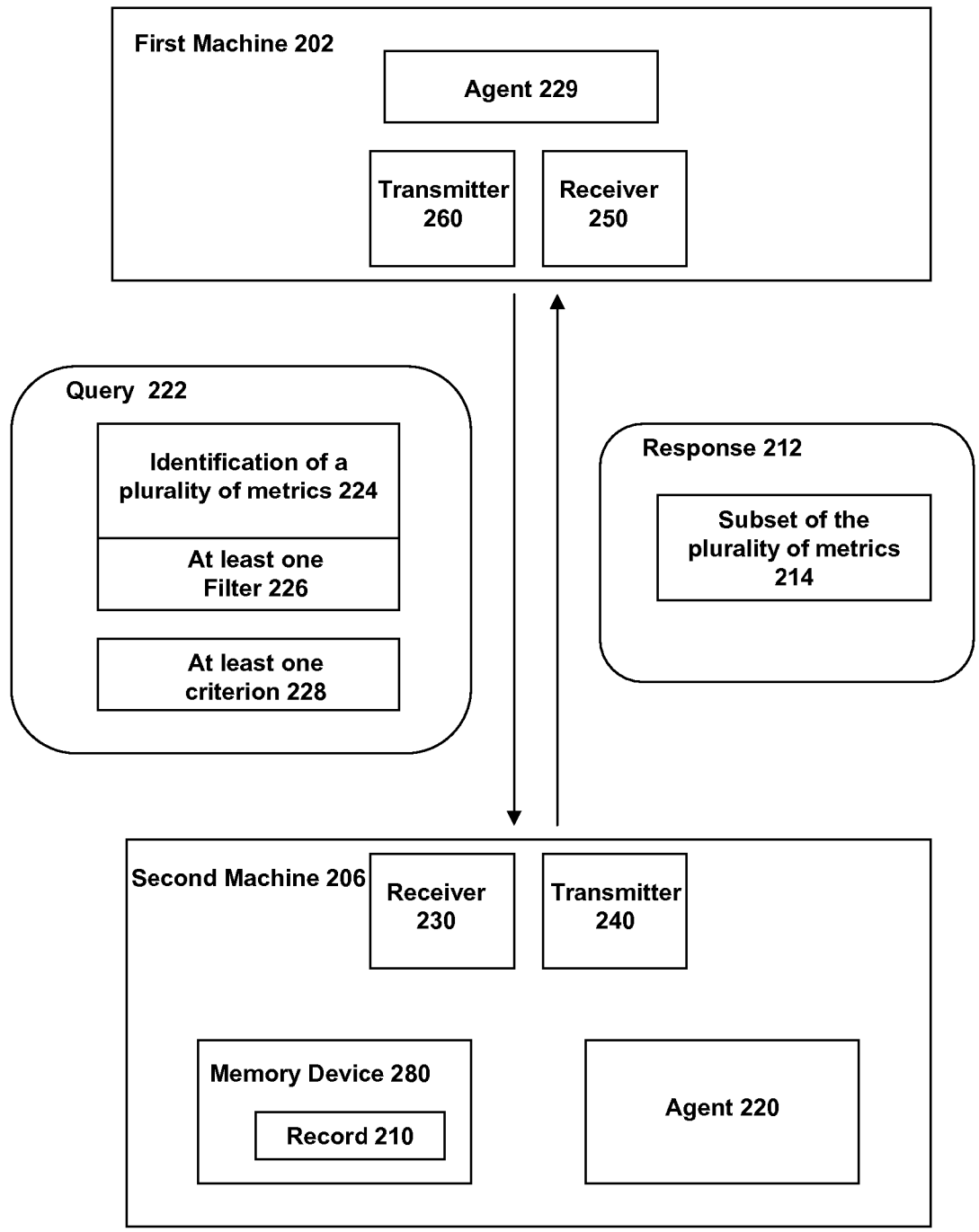
FIG. 2B is a block diagram depicting a embodiment of a system for gathering and selectively synchronizing state information of at least one machine.

Referring now to FIG. 2B, a block diagram depicts an embodiment of a system for gathering and selectively synchronizing state information of at least one machine. In brief overview, the system includes a first machine 202 generating a query 222 identifying a plurality of metrics characterizing a state of a second machine 206, and a second machine 206 including an agent 220 and generating a response 212.

Referring now to FIG. 2B, and in greater detail, the first machine 202 and the second machine 206 may be any machine, node or client as described above in connection with FIGS. 1A-1C and 2A. In one embodiment, the first machine 202 is a collator. In another embodiment, the first machine 202 is a worker. In still another embodiment, the first machine 202 is both a collator and a worker. In yet another embodiment, the first machine 202 can be a collator or a worker with respect to another machine at different points in time. In still even another embodiment, the first machine 202 is part of the machine farm 38 described earlier in connection with FIG. 2A.

In one embodiment, the second machine 206 is a collator. In another embodiment, the second machine 206 is a worker. In still another embodiment, the second machine 206 is both a collator and a worker. In yet another embodiment, the second machine 206 can be a collator or a worker with respect to another machine at different points in time. In still even another embodiment, the second machine 206 is part of the machine farm 38 described above in connection with FIG. 2A.

In one embodiment, the second machine 206 includes a receiver 230 or a transceiver (not shown). In another embodiment, the second machine 206 receives a query 222, via the receiver 230 or the transceiver, from the first machine 202. In one embodiment, the second machine 206 generates a response 212. In still another embodiment, the second machine 206 includes a transmitter 240. In yet another embodiment, the second machine 206 transmits the response 212, via the transmitter 240 or a transceiver, to the first machine 202.

In one embodiment, the first machine 202 generates a query 222. In another embodiment, the first machine 202 includes a transmitter 260 or a transceiver (not shown). In still another embodiment, the first machine 202 transmits the query 222, via the transmitter 260 or the transceiver, to the second machine 206. In yet another embodiment, the first machine 202 includes a receiver 250. In still even another embodiment, the first machine 202 receives a response 212, via the receiver 250 or transceiver, from the second machine 206.

In one embodiment, a query 222 is stored in a configuration file (not shown). In another embodiment, the configuration file is written in an expressive language. In still another embodiment, a software developer, programmer or an administrator writes the content for the configuration file. In yet another embodiment, the configuration file is a template for a query 222. In still even another embodiment, the configuration file includes a default set of values for generating a query 222. In still yet another embodiment, the configuration file provides at least one default query 222.

In one embodiment, the first machine 202 provides a user interface for viewing, editing or generating a configuration file. In another embodiment, the configuration file is provided in a software package, such as a presentation layer protocol program. In still another embodiment, the configuration file is transmitted or updated via any communications protocol to the first machine 202. In still another embodiment, the configuration file may be customized in the first machine 202, for example, via the user interface by a user or an administrator.

In one embodiment, the first machine 202 provides a user interface (not shown) allowing a user—such as a developer, system integrator, or administrator—to generate or modify a query 222 for transmission to the second machine 206. In another embodiment, the user interface is provided by another machine in communication with the first machine 202. In still another embodiment, the user interface is provided by a central collator. In yet another embodiment, the user interface is a graphical user interface (GUI). In still even another embodiment, an administrator specifies a query 222 in an expressive language via the user interface.

In one embodiment, the user interface receives as an input a file specifying a query 222. In another embodiment, the file contains specifications for more than one query 222. In still another embodiment, the file contains specifications written in an expressive language. In yet another embodiment, a query 222 is automatically generated based on one or more of machine, collator, network, and machine farm 38 conditions.

In one embodiment, the first machine 202 includes an agent 229. In another embodiment, the agent 229 is the client agent 120. In another embodiment, the agent 229 may be hardware, software, or a combination of both. In still another embodiment, the agent 220 transmits a query 222. In yet another embodiment, the agent 229 generates the query 222. In still even another embodiment, the agent 229 forwards the generated query 222 to the transmitter 260 for transmission to the second machine 206

In one embodiment, the second machine 206 includes an agent 220. In another embodiment, the agent 220 is the client agent 120. In still another embodiment, the agent 220 may be hardware, software, or a combination of both. In yet another embodiment, the agent 220 maintains and updates the record 210 of metrics. In still even another embodiment, the agent 220 includes a parser (not shown) for evaluating queries written in an expressive language.

In one embodiment, the agent 220 determines whether to respond to a query 222, responsive to the identified at least one criterion in the query. In another embodiment, the agent 220 transmits a response 212 including a subset of the plurality of metrics, responsive to the determination. In still another embodiment, the agent 220 generates the response 212. In yet another embodiment, the agent 220 comprises means for identifying a subset of a plurality of metrics to include in a response, the identification based in part on the maintained record 210. In still even another embodiment, the agent 220 forwards the generated response 212 to the transmitter 240 for transmission to the first machine 202.

In one embodiment, the agent 229 is substantially the same as the agent 220. For example, since the first machine 202 and the second machine 206 can function as either a collator or a worker at different point in time, agent 229 and agent 220 can assume the appropriate functionalities described above as they transmit or receive a query 220, or as they transmit or receive a response 212.

In one embodiment, the query 222 identifies a plurality of metrics describing the state of a second machine. In another embodiment, the query 222 includes at least one criterion 228 for evaluation by an agent 220 in the second machine 206, the at least one criterion identifying a circumstance in which the agent 220 should respond to the query 222. In still another embodiment, the query 222 includes at least one filter 226 identifying a subset of the plurality of metrics that the agent 220 may include in a response to the query 222. In some embodiments, a query includes a plurality of sub-queries. In one of these embodiments, the identification of the plurality of metrics 224 is a first sub-query. In another of these embodiments, the at least one filter 226 is a second sub-query. In still another of these embodiments, the at least one criterion each is a third sub-query.

In one embodiment, the query 222 is a retransmission of a query received by a first collator 202a. In another embodiment, the query 222 includes a portion of a query 222 received by a first collator 202a from a second collator 202b. In still another embodiment, the query 222 may be included in an encrypted or unencrypted message. In yet another embodiment, the query 222 may be included in a compressed or uncompressed message. In some embodiments, a collator 202 monitors a subset of a plurality of states associated with a second machine 206, the subset of the plurality of states changing over time. In one of these embodiments, the query 222 describes the subset of the plurality of states to be monitored.

In one embodiment, the query 222 may include a response to the second machine 206. In another embodiment, the query 222 may include instructions, status information, metrics, address information, path mapping information, encryption information, or other information to be relayed to another machine. In still another embodiment, the query 222 may be an empty message, for example, to indicate that no responses are to be sent from a worker 206 until the worker 206 receives another query that is non-empty. This can serve the purpose of reducing network traffic or creating a "no-response" period in which the collator 202 may re-initialize. In yet another embodiment, the query 222 is a polling message. In still even another embodiment, the query 222 is a test message used in network management and administration. In still yet another embodiment, the query 222 can be a message supported by any of the protocols described above in connection with FIG. 1A. In still even another embodiment, the contents of the query 222 are configurable. In still further another embodiment, the query 222 includes a list. In some embodiments, the query 222 is written in an expressive language.

In one embodiment, the query 222 includes an identification of a plurality of metrics 224, the plurality of metrics characterizing a state of a second machine 206. In another embodiment, a metric in the identified plurality of metrics can represent load information associated with the second machine 206 (e.g., the number of processes on the machine, CPU and memory utilization). In still another embodiment, the metric can represent port information (e.g., the number of available communication ports and the port addresses). In yet another embodiment, the metric can represent session status (e.g., the duration and type of processes, and whether a process is active or idle).

In one embodiment, the metric can represent an aspect of the underlying hardware, software, processes, virtual machines, license usage, subscription data, traffic or bandwidth associated with the second machine 206. In another embodiment, the metric is associated with a third machine (not shown). In still another embodiment, the metric is associated with a first machine 206a but stored or maintained in a second machine 206b. In still even another embodiment, the metric is associated with a first machine 206a but monitored or measured by a second machine 206b. In yet another embodiment, use of the identification of the plurality of metrics 224 by the second machine 206 may be conditioned by factors associated with one or a combination of the second machine 106, the network 104 and the machine farm 38.

In one embodiment, an identification of the plurality of metrics 224 may include a description written in an expressive language. In another embodiment, the plurality of metrics 224 are identified by patterns in the plurality of metrics 224 described by the expressive language. For example, the pattern 'Session.*.UserId' can represent any metric having a name beginning with 'Session.' and ending with '.UserId'. In some embodiments, using an expressive language in a query 222 provides an administrator with benefits over hard coding a list of metrics for monitoring a given machine. In one of these embodiments, for example, using the expressive language may allow different collection algorithms to be dynamically selected. In another of these embodiments, for example, the expressive language may allow the monitoring system to be manually or automatically adjusted, to best suit the prevailing conditions of the network 104 and the machine farm 38. In still another of these embodiments, for example, an administrator can use the expressive language to request for reduced information responsive to network and collator conditions, resulting in better utilization of the network bandwidth and lower overhead in parsing responses.

In one embodiment, using the expressive language decouples the information being collected from the way in which it is collected. For example, an administrator does not have to select a specific algorithm for generating a metric—the metric is specified generically via expressive language and the agent 220 automatically selects an algorithm for generating the metric. In yet another embodiment, as software on a machine 206 evolves or as new types of machines 202, 206 are introduced, different types of information may be made available for monitoring, via the expressive language, without having to change the monitoring system itself. For example, new features enabled by changes in the underlying software or hardware can be supported with relatively minor updates to the expressive language without requiring an administrator to understand or modify multiple levels of the system.

In some embodiments, use of the systems and methods described herein provides advantageous flexibility in identifying metrics for monitoring. For example a metric identifying a rapidly changing characteristic may be specified once, and indirectly (such as by using Session.*.UserID) while static characteristics may be specified consistently and explicitly (Info.OSVersion). In other embodiments, a plurality of metrics to be monitored are described in a query 222 using patterns 224 written in the expressive language. In still other embodiments, a consistent format for expressing and identifying metrics is provided, which may be used to express metrics substantially similarly regardless of whether the metric changes frequently or is substantially static. In further embodiments, the patterns may be described using a standard format. The following patterns are examples of patterns that may be used in expressing a metric:

1. exact string pattern: 'Load.CPU' (matches a metric with the exact name 'Load.CPU');
2. wildcarded string pattern: 'Session.*.UserId' (matches any metric having a name beginning with 'Session.' and ending with '.UserId');
3. regexp string. pattern: 'Session.[~.]*.UserId' (matches any metric having a name matching the regular expression); and
4. An expression using a query language such as XPath or SQL.

In one embodiment, the query 222 may include at least one filter 226 identifying a subset of the identified plurality of metrics to be included in a response to the query 222. In another embodiment, the at least one filter 226 is part of the description that identifies the plurality of metrics. In still another embodiment, the at least one filter 226 may be applied to the identified plurality of metrics to identify a subset of the identified plurality of metrics to include in a response 212. In yet another embodiment, the at least one filter 226 is described in an expressive language. In still even another embodiment, use of the at least one filter 226 by the second machine 206 may be determined by factors associated with at least one of the second machine 206, the network 104 and the machine farm 38. For example, if the agent 220 on the second machine 206 identifies a new metric that had not been synchronized with the first machine 202, and that would have been filtered by the at least one filter 226, the agent 220 can decide to transmit the metric despite the at least one filter 226. This serves to "notify" the first machine 202 of the new metric such that the first machine 202 may adjust the next set of filters if necessary.

In one embodiment, a filter 226 may be applied to the plurality of metrics to further identify the subset of the plurality of metrics to be communicated to either a worker or a collator in the machine farm 38. In another embodiment, the at least one filter 226 represents a filter sub-query and is expressed in terms of metrics associated with the second machine 206. In still another embodiment, the at least one filter 226 may use expressions and operators for comparisons (=, <=, >=etc.) and Boolean logic (and, or, not) from the expressive language to identify the subset of the plurality of metrics. In yet another embodiment, the at least one filter 226 may use a set of custom expressions, such as 'changedSinceLastSync', or 'UserIsMemberOfGroup'. In still even another embodiment, the set of custom expressions can be large and can evolve over time.

In one embodiment, different custom expressions can serve different purposes, for example, custom expressions to interact with the monitoring system may include: changedSinceLastSync, IncreasedSinceLastSync, errorSinceLastSync, IsSoleCollator, IsTrustedCollator, HighBandwidthConnection. In another embodiment, examples of custom expressions to provide functions to manipulate metrics may include: UserIsMemberOfGroup, LicenseWasValidate, ServerIsReachable. In still another embodiment, examples of custom expressions to provide additional metrics purely for filtering may include: OsVersion( ), InstantaneousLoad( ). In still another embodiment, examples of custom expressions to provide comparisons between sets of metrics may include: HighestMatchingPattern( ), LowestMatchingPattern( ).

In one embodiment, patterns in the expressive language associated with the at least one filter 226 may include wildcards. For example, a wildcard pattern 'Session.*.UserId' within the at least one filter 226 may be evaluated to 'Session.12.UserId', as the 'Session.*' Prefix is matched by 'Session. 12'. In another embodiment, metrics evaluated from a pattern or a custom expression in the expressive language may be considered for transmission. In still another embodiment, metrics evaluated from a pattern or a custom expression in the expressive language may be excluded for transmission. In yet another embodiment, a metric evaluated from a pattern in the filter are not evaluated. In still even another embodiment, a metric evaluated from a pattern in the filter are evaluated. In still yet another embodiment, an evaluation of a metric involves using the name of a metric under consideration to evaluate any patterns in the at least one filter 226.

In one embodiment, a query 222 including a set of patterns identifying a plurality of metrics, and a filter 226, is described in the expressive language as:
Patterns: Session.*.Status
   Session.*.UserId
   Session.*.AppList.*.Name
Filter: Not(InGroup(Metric(Session.*.UserId), 'Audit'))

In this embodiment, the set of patterns in the expressive language indicates that the UserId, Status and names of applications within current applications sessions on the second machine 206 is requested by the first machine 202. In one embodiment, the filter 226 may further restrict the request so that if a user associated with the session is a member of the 'Audit' group, no information associated with the user will be transmitted to the first machine 202 in a response 212. In another embodiment of the example above, a company's compliance policy may require that information about sessions related to the internal audit team will not be transmitted to, for example, an identified plurality of collators accessible by external contractors. In still another embodiment, filtering may be used as described above to reduce the load placed on the network 104 or the collator 202 by the monitoring process. In yet another embodiment, filtering may be used to ensure that sensitive information is not transmitted.

In one embodiment, if the second machine 206 does not support a custom expression from a query 222, the second machine 206 ignores the expression that includes the custom expression when the second machine 206 generates a response 212. In another embodiment, if the second machine 206 does not support any aspect of the query 222, the second machine transmits all states associated with the second machine 206 in a response 212. In still another embodiment, if the second machine 206 supports only a subset of the expressions in a query 222, the second machine 206 will only transmit metrics identified by the subset of expressions in a response 212. For example, if the second machine 206 supports the patterns in a query 222 but not the filter 226, the second machine 206 ignores the filter and transmits all metrics identified by the patterns in a response 212. In yet another embodiment, if the second machine 206 supports most of the filters 226, more metrics will be filtered and less metrics will be transmitted in a response 212. In some embodiments, the expressive language is used to develop queries applicable to a plurality of machines 102, 206 with heterogeneous capabilities. In one of these embodiments, for example, a machine 206 that supports a larger subset of the expressive language will be able to generate a more concise response 212. In one of these embodiments, for example, a machine 206 may include software to be updated periodically to support the latest changes to the expressive language.

In some embodiments, a filter 216 may include a filter expression as well as a fallback action for cases in which the second machine 206 does not support the filter expression. In one embodiment, fallback actions may include 'send all', 'send none' and 'report error'. In other embodiments, however, the fallback function may indicate an explicit alternative expression. For example, in one embodiment, the expression:
   fallback(IsWindowsPC( ),IndexOf(Metric('Info.OSVersion'), 'win')>0)
indicates that the value of a custom expression, IsWindowsPC( ), should be used if the custom expression is understood. However, if the custom expression is not understood (i.e., if the machine cannot process the expression), for example, because the machine is running a version of the software that does not support the IsWindowsPC® function, the value of
   IndexOf(Metric('Info.OSVersion'),'win')>0
should be used instead. In another embodiment, the machine 206 may not support the custom expression because the machine 206 supports an older version of the system which, for example, may not include logic for processing the expression. In still another embodiment, fallback function returns a "false" state if the machine does not support a custom function or cannot determine if the machine is a WINDOWS PC. In yet another embodiment, this expression looks for the string 'win' within the value of the metric 'Info.OSVersion' and reports true if it exists. In still even another embodiment, the fallback function may provide numerous alternatives, in case the second machine 206 cannot process one of the fallbacks. In one embodiment, for example, the 'True' filter in:

fallback(IsWindowsPC( ),IndexOf(Metric('Info.OSVersion'),'win')>0),True)

is a filter that is trivially met.

In one embodiment, if a second machine 206 does not support all of the contents in a query 222, the synchronization process will still proceed, but may result in some redundant data transmission and may affect the efficiency of the monitoring system. In another embodiment, the semantics of the data transmitted is unaffected. In still another embodiment, this feature will allow a separate evolution of a machine 202, 206 in the machine farm 38 and of the expressive language, allowing the synchronization process to proceed even if the machine 202, 206 does not support some new features in the expressive language.

In one embodiment, the query 222 includes at least one criterion 228 identifying a circumstance for synchronization between the first machine 202 and the second machine 206. In another embodiment, the query 222 includes at least one criterion 228 for the second machine 206, identifying a circumstance in which to respond to the query 222. In still another embodiment, the query 222 includes at least one criterion 228 for the second machine 206, identifying a circumstance in which to not respond to the query 222. In yet another embodiment, the at least one criterion 228 describes when synchronization should take place between the first machine 202 and the second machine 206. In further embodiments, synchronization describes an exchange or transmission of updated information, which can include metrics, between two machines.

In one embodiment, the query 222 includes at least one criterion specifying a time period within which to respond to the query 222. In another embodiment, the at least one criterion 228 includes a time period relative to an event within which to respond to the query. In still another embodiment, the start time for the time period may be after the event, for example, five seconds after the event. In yet another embodiment, the start time for the time period may be before the expected or scheduled event, for example, ten seconds before the event. In still even another embodiment, the end time for the time period may be after the event, for example, five seconds after the event. In still yet another embodiment, the end time for the time period may be before the expected or scheduled event, for example, ten seconds before the event.

In one embodiment, the event is the receipt of the query. In another embodiment, the event is a change in one of the plurality of metrics. In still another embodiment, the event in a combination of a receipt of the query and a change in one of the plurality of metrics. In yet another embodiment, the at least one criterion 228 specifies a time instant at which to respond to the query 222. In still even another embodiment, the at least one criterion 228 specifies a recurring time interval for responding to the query 222.

In one embodiment, the at least one criterion 228 may specify conditions associated with network congestion, network disruption, administrative or other requirements that may cause a respond to the query 222 to be canceled, rescheduled, or resent. In some embodiments, use of the at least one criterion 228 by the second machine 206 may be conditioned by factors associated with at least one of the second machine 106, the network 104 and the machine farm 38. In other embodiments, the at least one criterion 228 is described in the query 222 by expressive language, for example:

Patterns: Session.*.Status
  Session.*.UserId
  Session.*.AppList.*.Name

Filter: Not(InGroup(Metric(Session.*.UserId), 'Audit'))
MaxDelayBefore Sending: 10 seconds
MinDelayBeforeSending: 5 seconds In one of these embodiments, for example, when a metric matching the patterns 224 and filter 226 changes, the metric is sent to the first machine 202. In another of these embodiments, if the second machine 206 supports the MinDelayBeforeSending criterion, the second machine 206 will delay sending the metric for at least five seconds. In still another of these embodiments, this may be useful to capture additional metric changes within this interval, allowing multiple changes to be sent at the same time. In yet another of these embodiments, this scheme may be more efficient than sending metric changes individually. In still even another of these embodiments, if the second machine 206 supports the MaxDelayBeforeSending criterion, then the second machine 206 will send the metrics within 10 seconds, regardless of whether other metrics have changed.

In one embodiment, a second machine 206 that does not support any of these criteria may make its own determination as to when to send metric changes. In another embodiment, metric changes will be sent immediately if the second machine 206 does not support any of these criteria. In still another embodiment, the second machine 206 sends a response including a warning message if the second machine 206 does not support any of these criterion.

In one embodiment, the use of the expressive language described above may allow rapidly changing and infrequently changing system performance metrics to be described and monitored under a single system and in a consistent fashion. In another embodiment, it is possible to tune the rate of collation without changing the semantics or meaning of the data in a query 222 and to set different rates for monitoring different metrics in different circumstances. In still another embodiment, because the metrics being monitored are decoupled from the machine farm 38 implementation, and due to the features enabled by the filtering system, the mechanics of the synchronization process can be changed more easily. In yet another embodiment, a plurality of collators 202, 106 may monitor simultaneously, either for robustness, or for different purposes—for example, in load and diagnostic monitoring.

In one embodiment, the response 212 includes the subset of the plurality of metrics identified by at least one query 222 from the first machine. In another embodiment, the subset of the plurality of metrics describes a state of the second machine 206. In still another embodiment, the subset of the plurality of metrics describes a state of a third machine 106. In yet another embodiment, a response from another machine is retransmitted as the response 212. In still even another embodiment, the response 212 is generated from a response from another machine. In still yet another embodiment, the response 212 may be included in an encrypted or unencrypted message. In still further another embodiment, the response 212 may be included in a compressed or uncompressed message.

In one embodiment, the response 212 may include a query to the first machine 202. In another embodiment, the response 212 may include instructions, status information, metrics, address information, path mapping information, encryption information, or information to be relayed to another machine. In still another embodiment, the response 212 can be an empty message. In yet another embodiment, the response 212 is a polling message. In still even another embodiment, the response 212 is a "heart beat" message to indicate that the second machine 206 is functional and responsive to communications.

In one embodiment, the response 212 is a test message used in network management and administration. In another embodiment, the response 212 is a message supported by any of the protocols described above in connection with FIG. 1A. In still another embodiment, the contents of the response 212 are configurable. In yet another embodiment, the response 212 includes a list. In still even another embodiment, the response 212 is written in an expressive language.

In one embodiment, the second machine 206 includes a memory device 280. In another embodiment, the memory device 280 is the main memory 122. In still another embodiment, the memory device 280 may be any type or form of memory described above in connection with FIGS. 1B-1C. In one embodiment, the memory device 280 stores a record of metrics 210 transmitted in at least one response 212 to the first machine 202. In another embodiment, the agent 220 generates the record of metrics 210. In still another embodiment, the agent 220 maintains the record of metrics 210 transmitted within a predetermined period of time. In still another embodiment, the agent 220 maintains a record of metrics 210 that have changed since the last transmission of metrics. In yet another embodiment, the agent 220 maintains a record of metrics 210 that have not changed after being transmitted. In still even another embodiment, the agent tracks, via the transmitter, metrics that have been transmitted.

In one embodiment, the record stores a record of metrics requested by one or more queries but not transmitted in a response. In another embodiment, the agent 220 maintains a record of metrics 210 transmitted to any machine. In still another embodiment, the record 210 stores at least one metric associated with the second machine 206. In yet another embodiment, the record 210 stores a history of at least one metric associated with the second machine 206. For example, the history of a metric may include all values of the metric and the corresponding time-stamps since the second machine 206 was powered up. In still even another embodiment, the record 210 stores the state of the second machine 206. In still yet another embodiment, the record 210 stores the state history of the second machine 206. For example, the state history may include a plurality of metrics and their corresponding values and time-stamps since the second machine 206 was last powered up.

In one embodiment, a subset of the plurality of metrics is identified for inclusion in a response, based in part on the maintained record 210. In another embodiment, the second machine 206 includes means to identify the subset of the plurality of metrics to include in a response 212, the identification based in part on the maintained record 210. In still another embodiment, the software and client agent 120 described above in connection with FIG. 1B identifies the subset of the plurality of metrics to include in a response 212. In yet another embodiment, the second machine 206 includes an agent 220, identifying the subset of the plurality of metrics to include in a response 212. In still even another embodiment, the agent 220 includes means to identify the subset of the plurality of metrics to include in a response 212. For example, in one embodiment, the agent 220 includes an evaluation component that evaluates the maintained record 210 to identify the subset of the plurality of metrics to include in a response 212.

Figure 3:
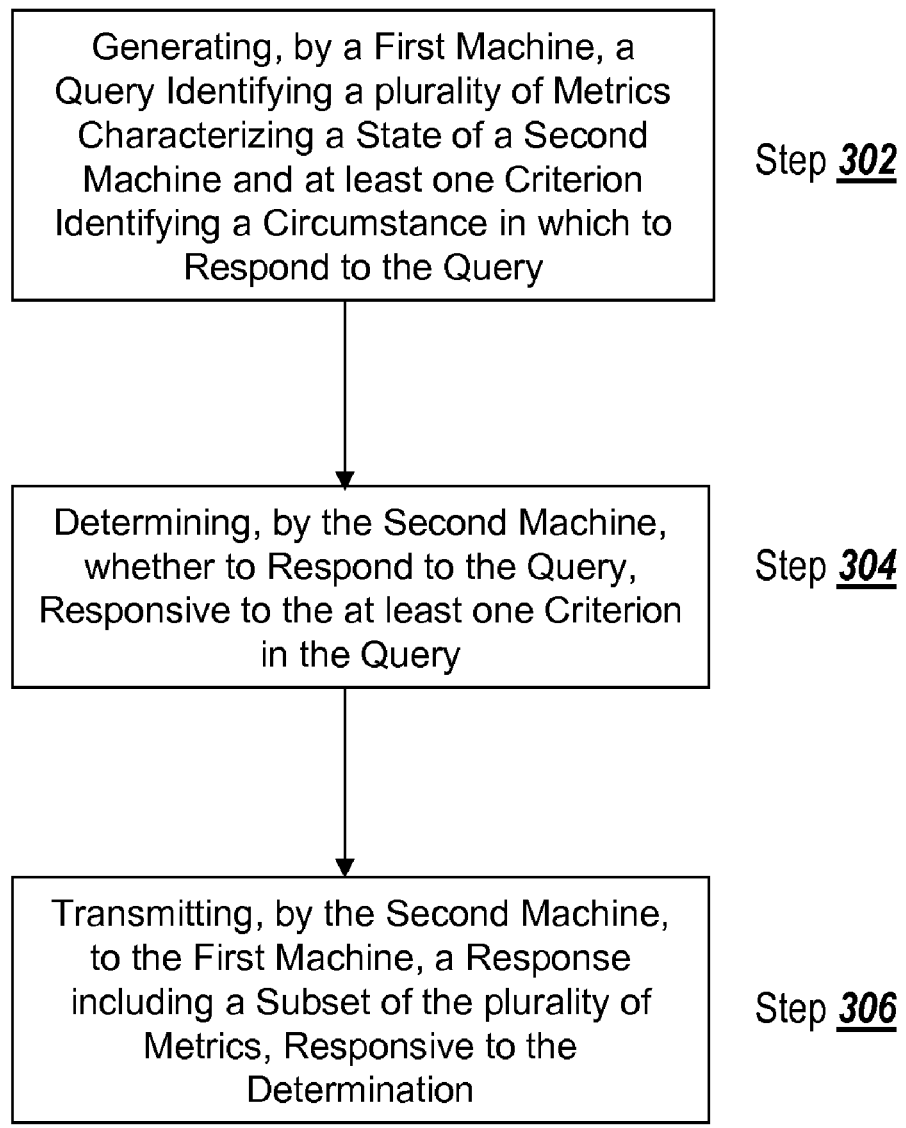
FIG. 3 is a flow diagram depicting one embodiment of the steps taken in a method for gathering and selectively synchronizing state information of at least one machine.

Referring now to FIG. 3, a flow diagram depicts one embodiment of the steps taken in a method 300 for gathering and selectively synchronizing state information of at least one machine. In brief overview, the method includes generating, by a first machine, a query identifying a plurality of metrics characterizing a state of a second machine and at least one criterion identifying a circumstance in which to respond to the query (302). The method includes determining, by the second machine, whether to respond to the query, responsive to the criterion in the query (304). The method includes transmitting, by the second machine, to the first machine, a response including a subset of the plurality of metrics, responsive to the determination (306).

Referring now to FIG. 3, and in greater detail, the first machine 202 generates a query identifying a plurality of metrics characterizing at least one state of a second machine and at least one criterion identifying a circumstance in which to respond to the query (302). In one embodiment, the first machine 202 receives, via receiver 250, the query 222 from another machine. In another embodiment, a third machine 102' generates the query 222. In still another embodiment, the first machine 202 encrypts the query 222 before transmission. In yet another embodiment, the first machine 202 compresses the query 222 before transmission. In some embodiments, the first machine generates the query 222 in order to monitor at least a state of a second machine 206.

In one embodiment, an agent 229 on the first machine 202 generates the query 222. In another embodiment, the agent 220 receives a predefined query 220, for example, a predefined query 220 stored on and transmitted from the first machine 202. In still another embodiment, the agent 220 receives a query 222 via a file, for example, on a CDROM, the file storing a plurality of queries, each of the query associated with a time schedule and retrieved according to the time schedule. In yet another embodiment, the query 222 is received from a third machine 102'. For example, the query 222 is generated by the third machine 102' responsive to a command from the first machine 102.

In one embodiment, the first machine 202 identifies a plurality of metrics describing the state of a second machine for inclusion into the query 222. In another embodiment, the first machine 202 identifies at least one criterion 228 for the second machine 206 identifying a circumstance for the second machine 206 to respond to the query 222, for inclusion in the query 222. In still another embodiment, the first machine 202 identifies, for inclusion in the query 222, at least one criterion 228 specifying a time for a second machine 206 to transmit a response the first machine 202. In yet another embodiment, the first machine 202 identifies, for inclusion in the query 222, at least one filter 226 identifying a subset of the plurality of metrics which may be included in a response to the query 222. In some embodiments, a third machine identifies one or more of the plurality of metrics, the at least one criterion 228, and the at least one filter 226, for inclusion in the query 222 generated by the first machine 202.

In some embodiments, the query 222 is generated in an expressive language as described above in connection with FIG. 2B. In one embodiment, the first machine 202 may flexibly adjust the content between a plurality of queries 222 using the expressive language, such as changing the plurality of metrics identified, the at least one criterion 228 identified, or the at least one filter 226 identified. In another embodiment, the first machine 202 may adjust the content of a query 222 depending on the capability of the second machine 106, such as the complexity of expressive language supported by the second machine 106. In some embodiments, the first machine 202 may include one or more of instructions, status information, metrics, address information, path mapping information, encryption information, and information to be relayed to another machine, in the query 222.

In one embodiment, an administrator accesses a user interface to specify the contents of the query 222. In another embodiment, the administrator specifies the contents using an expressive language. In still another embodiment, the administrator uses a user interface provided by the first machine 202 to specify the contents of the query 222. In yet another embodiment, the user interface is provided by a machine in communication with the first machine 202. In still even another embodiment, the user interface provided is a graphical user interface (GUI). In still yet another embodiment, the user interface receives a file from the administrator, the file including the specification of the contents of the query 222.

In one embodiment, the first machine 202 transmits the query 222 via the transmitter 260. In another embodiment, the first machine transmits the query 222 to the second machine 206 via the network 104. In still another embodiment, the first machines polls a second machine 206 by transmitting a query 222. In yet another embodiment, the first machine 202 initiates synchronization with the second machine 206 by transmitting a query 222. In still even another embodiment, the first machine 202 transmits the query 222 to the second machine 206 for retransmission to a third machine.

In one embodiment, the second machine 206 receives, via a receiver 230 on the second machine 206, the query 222. In another embodiment, the second machine 206 processes the query 222, which may include one or more of decompression, decryption, parsing, filtering and reformatting. In still another embodiment, the second machine 206 may support at least a portion of the query 222. In yet another embodiment, the second machine 206 may consolidate one or more queries 222 from the first machine 202 into a single query 222.

In some embodiments, the agent 220 performs one or more of the consolidation, decompression, decryption, parsing, filtering and reformatting. In one of these embodiments, the second machine 206 retrieves the plurality of metrics identified in the query. In another of these embodiments, the agent 220 retrieves the plurality of metrics. In still another of these embodiments, the plurality of metrics is retrieved from a storage device of any type or form described above in connection with FIGS. 1B-1C. In still another of these embodiments, the plurality of metrics is retrieved from the record 210 of metrics. In still even another of these embodiments, the plurality of metrics is retrieved from a third machine or an external storage device of any type described above in connection with FIGS. 1B-1C. In some embodiments, the plurality of metrics is retrieved based in part on the subset of the expressive language supported in the second machine 106.

In one embodiment, the second machine 206 uses the at least one filter 226 included in the query 222 to filter the retrieved plurality of metrics. In another embodiment, the second machine 206 filters the retrieved plurality of metrics, the filtering based in part on the subset of the expressive language supported in the second machine 106. In still another embodiment, the plurality of metrics retrieved and included in a response 212 is not filtered. In yet another embodiment, the at least one filter 226 is ignored by the agent during generation of the response 212. In still another embodiment, the at least one filter 226 is selectively ignored by the agent 220 during generation of the response 212, and may be based on conditions and capabilities associated with one or more of the second machine 106, the network 104 and the machine farm 38.

The second machine 206 determines whether to respond to the query 222, responsive to the at least one criterion 228 in the query 222 (304). In one embodiment, the agent 220 determines whether to respond to the query 222, responsive to the at least one criterion 228 in the query 222. In another embodiment, the agent 220 may support a subset of the expressive language. For example, the agent 220 may include software that has not been updated to support the new features of the expressive language, or the query 222 may have been broadcasted to a plurality of machines, each of the plurality of machines supporting a slightly different subset of the expressive language. In still another embodiment, the agent 220 determines whether to respond to the query 222 based in part on the subset of the expressive language supported. In yet another embodiment, the agent 220 determines whether to respond to the query 222 based in part on a record 210 maintained by the agent 220.

In one embodiment, the agent 220 maintains a record 210 of metrics included in a response to the first machine 202. In another embodiment, the agent 220 updates the record 210 based on responses transmitted. In still another embodiment, the transmitter 240 updates the record 210 based on responses transmitted. In yet another embodiment, the record 210 maintains a history of metrics, including metrics transmitted and metrics changed since transmission.

In one embodiment, the agent 220 identifies a subset of the plurality of metrics 214 to include in the response 212 to the first machine 202. In another embodiment, the subset of the plurality of metrics 214 is identified based on the maintained record 210. In still another embodiment, the subset of the plurality of metrics 214 is identified based in part on the at least one filter 226. In yet another embodiment, the subset of the plurality of metrics 214 is identified based in part on any combination of conditions associated with the second machine 206, the network 104, and the machine farm 38.

In one embodiment, the second machine 206 transmits a response 212 including a subset of the identified plurality of metrics, to the first machine 202, responsive to the determination on whether to respond to the query (306). In another embodiment, the second machine 206 always transmits a response 212 responsive to a query 222. In still another embodiment, the second machine 206 does not transmit a response 212, responsive to the determination. In yet another embodiment, the second machine 206 transmits at least one metric not included in the plurality of metrics, responsive to the determination. In one embodiment, the second machine 206 transmits a response 212 responsive to a change in a metric. In another embodiment, the second machine 206 transmits a response 212 responsive to one or more preset times. In still another embodiment, the second machine 206 transmits a response 212 at a regular interval, for example, every 15 seconds. In still another embodiment, the second machine 206 broadcasts a response 212 to one or more collators 202, 106 in the machine farm 38. In yet another embodiment, second machine 206 broadcasts a response 212 to all machines in the machine farm 38.

In one embodiment, the second machine 206 transmits a response 212 including all metrics associated with the second machine 106. In another embodiment, the second machine 206 transmits a response 212 including all metrics maintained by the second machine 106. In still another embodiment, the second machine 206 transmits a response 212 including all metrics received by the second machine 206 from one or more machines in the machine farm 38. In yet another embodiment, the second machine 206 transmits a response 212 including a history of a subset of the plurality of metrics identified in one or more queries 212. In still even another embodiment, the second machine 206 transmits a response 212 including a history of all metrics associated with the second machine 106. In still yet another embodiment, the second machine 206 transmits a response 212 including a history of the plurality of metrics identified in one or more queries 222.

The following illustrative examples show how the methods and systems discussed herein may be used for gathering and selectively synchronizing state information of at least one machine. These examples are meant to illustrate and not to limit the invention.

In some embodiments, and referring to FIG. 3, a worker 206 transmits only a portion of its state, represented by one or more metrics included in a response 212 to a collator 202. This scenario may be referred to as selective synchronization or weak synchronization. In one embodiment, the collator 202 receiving the response 212 resulting from selective synchronization may not have a complete view of the state of the second machine 106. In another embodiment, the first machine 202 may create a historical view of the state of the second machine 206 through a series of synchronizations involving a plurality of queries 222 and responses 212.

In one embodiment, and as an illustration, the synchronization approach is as follows: The worker 206 initially assumes that the collator 202 has no state information about the worker 206. On each synchronization, the worker 206 sends metrics that are either not on the collator 202, or that have differing values between the worker 206 and the collator 202. The worker 206 stores an identification of which values have been transmitted to the collator 106, so that it can perform comparisons during the next synchronization. Each synchronization has a serial number, so that the collator 202 can detect missed information. After an error or a missed synchronization, the collator 202 instructs the worker 206 to restart so that the state of the worker 206 can be initialized with respect to both the worker 206 and the collator 202.

In some of these embodiments, a timestamp may be associated with each metric indicating when the metric was last sent to the collator 202. In one of these embodiments, the current time is included in each synchronization response 212. In another of these embodiments, after an error is detected, the collator 202 can indicate the time of the last response 212 successfully received, and only metrics that have changed since this time will be retransmitted by the worker 206.

In some embodiments, the monitoring system may handle removed metrics in specific ways. In one of these embodiments, for example, metrics associated with sessions are dynamically created and removed during execution of applications on a worker 206. In another of these embodiments, for example, a metric 'Session.12.UserId' may come into existence when session 12 is created. In still another of these embodiments, when session 12 is terminated, the metric is removed. In yet another of these embodiments, a special value 'DoesNotExist' can be sent to indicate that a metric no longer exists. In still even another of these embodiments, if a 'DoesNotExist' value is sent for a metric, both the first machine 202 and the second machine 206 will treat all metrics with names starting with '12.' as removed.

In one embodiment, the worker 206 may discard one or more existing metrics based on properties and conditions related to the worker 206, the network 104, or the machine farm 38. In another embodiment, before a collator 202 sends a first query 222 to the worker 206, the collator 202 may have no knowledge of metric values associated with the worker 206. In still another embodiment, during reconnection after an error, the worker 212 may re-synchronize with the collator 202. In yet another embodiment, the worker 206 may create a new record of metrics. In still even another embodiment, if the collator 202 becomes aware of a metric that has been deleted, the collator 202 may request resynchronization. In one of these embodiments, the collator may discard all metrics associated with the worker 206. In still yet another embodiment, the collator 202 may request the worker 206 to send all valid metrics to the collator 202.

In some embodiments, the query 222 or the response 212 sent may contain a list of alternative addresses (for example, associated with alternative receiving collators or workers, or identifying a return address to the sending collator or worker) to be used if a receiving collator or worker is unavailable. In one of these embodiments, this may allow the sending worker or collator to detect and handle network 104 or machine failures. In another of these embodiments, machine failure is detected by monitoring a metric that is guaranteed to change (for example, a time displayed by a clock on the machine) and indicating that this metric should be periodically synchronized. In still another of these embodiments, if synchronization does not occur, then failure of the worker 206 or the network 104 is assumed. In yet another of these embodiments, a worker 206 is instructed to make periodic callbacks even if no monitored metric has changed. In still even another of these embodiments, this may allow a collator 202 to detect machine (worker) failure without explicitly monitoring any metric.

In one embodiment, network failure is handled by standard means, such as the sending and receiving of acknowledgements. In another embodiment, if a worker 206 cannot contact a collator 202 after a period of time, it will assume that collator 202 is unreachable, and will attempt to contact an alternative collator, if one was specified. In still another embodiment, acknowledgments can also be used to send changes to a query 222, for example, changing the metrics being monitored or the rate of synchronization. In yet another embodiment, the changes can be sent directly from a collator 202 to a worker 206 in a second query 222.

In one embodiment, the selective synchronization approach described above includes a series of sequential responses 212 from the worker 206 to the collator 202. In another embodiment associated with a large scale environment, a hierarchical monitoring network is provided. In still another embodiment, intermediate collators are sent a list of worker and a query 222. In yet another embodiment, the query 222 is forwarded to each worker 206. When synchronization occurs, responses 212 are sent back to the intermediate collators, which then forwards the responses 212 unprocessed to a central collator. In one embodiment, the intermediate collators may forward the responses, may collate several responses into one response before forwarding in order to reduce network usage, or may process the responses and only forward a summary of the information the responses contain. In still yet another embodiment, this hierarchical scheme can be extended to include a plurality of levels of machines.

In one embodiment, failure within the hierarchical monitoring system is handled using alternative addresses as described above. In another embodiment, for example, if a first intermediate collator cannot be reached, the query 222 or the response 212 identifies a second intermediate collators 202 for processing. In still another embodiment, as an intermediate collator holds no state information, it may not matter which intermediate collator have failed if at least some intermediate collators can be replacements.

In one embodiment, a hierarchical monitoring system includes a plurality of collators in communication with one another. In another embodiment, a first collator 202a transmits a query to a second collator 202b, the query identifying a plurality of metrics characterizing a state of a worker 206, and including at least one criterion identifying a circumstance, for the second collator 202b, in which to respond to the query. The second collator 202b processes the query and transmits the processed query 222 to the worker 206, the query including the plurality of metrics characterizing the state of the worker 206, and including at least one criterion identifying a circumstance, for the worker 206, in which to respond to the processed query 222. Responsive to the processed query 222, the worker 206, generates a response 212 including a subset of the identified plurality of metrics, and transmits the response 212 to the second collator 202b. Responsive to receiving the response 212, and responsive to meeting the at least one criterion identifying a circumstance for the second collator 202b to respond to the query, the response if forwarded to the first collator. The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems gathering and selectively synchronizing state information of at least one machine, it will now become apparent to one of skill in the art that other embodiments incorporating the concepts of the disclosure may be used. Therefore, the disclosure should not be limited to certain embodiments, but rather should be limited only by the spirit and scope of the following claims.

I claim:

1. A method for gathering and selectively synchronizing state information of at least one machine, comprising:
    (a) generating, by a first machine, a query identifying (i) a plurality of metrics characterizing a state of a second machine, (ii) a filter for identifying a subset of the plurality of metrics for inclusion in a response to the query, and (iii) at least one criterion identifying a circumstance in which to respond to the query, the filter and the at least one criterion specified using an expressive language, the filter comprising a fallback action for the second machine to take if the second machine does not support a portion of the expressive language used to specify the filter;
    (b) determining, by an agent on the second machine, whether to respond to the query, responsive to the at least one criterion in the query; and
    (c) transmitting, by the second machine, to the first machine, a response including at least a portion of the subset of the plurality of metrics, responsive to the determination.

2. The method of claim 1, wherein step (a) further comprises specifying, by the first machine, the fallback action to one of responding with the identified plurality of metrics, responding with none of the plurality of metrics, reporting an error, and filtering the plurality of metrics to include in the response based on an alternate specification using the expressive language.

3. The method of claim 1, wherein step (a) further comprises generating, by the first machine, a query including at least one criterion specifying a time at which to transmit the response to the first machine.

4. The method of claim 1, wherein step (c) comprises determining not to transmit a response to the first machine, responsive to the at least criterion in the query.

5. The method of claim 1, wherein step (c) comprises transmitting, by the second machine, a response including at least one metric not included in the plurality of metrics, responsive to the determination.

6. The method of claim 1, wherein step (c) further comprises transmitting, by the second machine, a response including at least one additional metric not included in the plurality of metrics, responsive to the determination.

7. The method of claim 1, wherein step (c) further comprises transmitting, by the second machine to the first machine, the response to the query including a plurality of metrics identified in a second query.

8. The method of claim 1 further comprising the step of maintaining, by the second machine, a record of the subset of the plurality of metrics included in the response transmitted to the first machine.

9. The method of claim 8, wherein step (c) further comprises identifying a second subset of the plurality of metrics to include in a second response to the first machine, responsive to the maintained record.

10. The method of claim 1 further comprising the step of generating, by a third machine, a query transmitted to the first machine, identifying a second plurality of metrics characterizing a state of the second machine and at least one criterion identifying a circumstance in which to respond to the query.

11. The method of claim 10 further comprising the step of receiving, by the third machine, a response from the first machine, the response from the first machine including a subset of the second plurality of metrics describing the state of the second machine.

12. A system for gathering and selectively synchronizing state information of at least one machine, comprising:
    a first machine generating a query identifying (i) a plurality of metrics characterizing a state of a second machine, (ii) a filter for identifying a subset of the plurality of metrics for inclusion in a response to the query, and (iii) at least one criterion identifying a circumstance in which to respond to the query, the filter and the at least one criterion specified using an expressive language, the filter comprising a fallback action for the second machine to take if the second machine does not support a portion of the expressive language used to specify the filter; and
    an agent, on the second machine, determining whether to respond to the query, responsive to the identified at least one criterion in the query, and transmitting a response including at least a portion of the subset of the plurality of metrics, responsive to the determination.

13. The system of claim 12, wherein the fallback action comprises one of responding with the identified plurality of metrics, responding with none of the plurality of metrics, reporting an error, and filtering the plurality of metrics to include in the response based on an alternate specification using the expressive language.

14. The system of claim 12, wherein the first machine further comprises means for generating a query including at least one criterion specifying a time period within which to respond to the query.

15. The system of claim 14, wherein the at least one criterion of the query further comprises an identification of a time period relative to an event within which to respond to the query.

16. The system of claim 15, wherein the event is the receipt of the query.

17. The system of claim 15, wherein the event is a change in one of the plurality of metrics.

18. The system of claim 12, wherein the second machine further comprises a transmitter, transmitting the response including the subset of the plurality of metrics to the first machine.

19. The system of claim 12, wherein the second machine further comprises a transmitter, transmitting the response including a plurality of metrics identified in a second query.

20. The system of claim 12, wherein the second machine further comprises a record of metrics included in at least one response transmitted to the first machine, the record maintained by the agent.

21. The system of claim 20, wherein the agent further comprises means for identifying a second subset of the plurality of metrics to include in a second response, the identification based in part on the maintained record.

22. The system of claim 12 further comprising a third machine generating a second query and transmitting the second query to the first machine, the second query identifying a second plurality of metrics describing a state of the second machine and at least one criterion for the first machine identifying a circumstance in which to respond to the query.

23. The system of claim 22, wherein the third machine further comprises a receiver, receiving a response from the first machine, the response including a subset of the second plurality of metrics describing the state of the second machine.

* * * * *